United States Patent [19]

MacDonald et al.

[11] Patent Number: 4,683,392

[45] Date of Patent: Jul. 28, 1987

[54] EDDY CURRENT COUPLING HAVING STEPPED ROTOR AND COIL SUPPORT

[75] Inventors: Daniel J. MacDonald, Brookfield; Thomas H. Jones, Wauwatosa, both of Wis.

[73] Assignee: MagneTek, Inc., Encino, Calif.

[21] Appl. No.: 371,900

[22] Filed: Apr. 26, 1982

[51] Int. Cl.[4] .............................................. H02K 49/02
[52] U.S. Cl. ................................................... 310/105
[58] Field of Search ............................ 310/93, 103, 105

[56] References Cited

U.S. PATENT DOCUMENTS

| | | | |
|---|---|---|---|
| 3,150,276 | 9/1964 | Moyer | 310/105 P |
| 3,167,674 | 1/1965 | Woodward, Jr. | 310/105 |
| 3,198,975 | 8/1965 | Fisher | 310/105 |

Primary Examiner—Donovan F. Duggan
Attorney, Agent, or Firm—John M. Haurykiewicz

[57] ABSTRACT

An eddy current coupling has a field coil (42) for magnetically coupling an inductor drum (26) and rotor (28). The thickness of the supporting arm (48) for the coil increases in a step-wise manner in a direction away from the end of the arm. The diameter of the adjacent portions (30) of the rotor is reduced in a corresponding manner to provide a plurality of air gaps (54a, 54b, 54c) across which the flux passes in radial directions. The flux passage and heat removal characteristics of the coupling are enhanced.

2 Claims, 2 Drawing Figures

Fig_1

4,683,392

EDDY CURRENT COUPLING HAVING STEPPED ROTOR AND COIL SUPPORT

TECHNICAL FIELD

An eddy current coupling device transmits torque between an input shaft connected to a prime mover and an output shaft connected to the load. Typically the eddy-current device is used to provide variable speed to the load when the prime mover operates at a constant speed, as is true, for example, for an a.c. induction motor.

In an eddy current coupling device, the input shaft typically rotates an inductor drum. A rotor member, commonly referred to as a pole structure, typically comprises a plurality of arcuately spaced poles and is mounted on the output shaft concentric to the inductor drum. The flux of a field coil establishes magnetic poles in the rotor and induces eddy currents in the inductor drum as long as there is a relative speed—i.e. slip—between the rotor and drum. The electromagnetic interaction of the rotor pole flux and the drum eddy currents transmits torque, or turning force. The degree of energization of the field coil determines the amount of torque transmitted between the input and output shafts for a given slip speed condition. A cooling medium, such as air or water, carries off heat generated in the coupling.

BACKGROUND ART

It is desirable in many types of couplings to locate the field coil radially inwardly of both the inductor and rotor. It is further desirable to use a stationary mounting of the field coil on the housing of the coupling to avoid the slip rings and brushes associated with rotating coils. The support or mounting for the field coil is typically L-shaped, having one arm fastened to the housing of the coupling and a second arm, on which the coil is mounted extending inside the inductor and rotor. The flux of the field coil passes through the coil support in completing its magnetic circuit through the rotor, inductor, and air gaps of the coupling.

The configuration of couplings presently in use have not optimized the passage of flux through the coil support and particularly the passage of the flux between the support and adjacent portions of the rotor.

Further, while locating the field coil inwardly of both the inductor and rotor has electro-mechanical advantages, it becomes more difficult to dissipate the heat generated in the coil by its energization. Existing designs have not provided for adequate dissipation of the heat.

DISCLOSURE OF THE INVENTION

The present invention is, therefore, directed to an eddy current coupling device so formed as to optimize flux passage through the coil support and to provide better heat dissipation from the coil.

The eddy current coupling device of the present invention includes a generally cylindrical inductor drum mounted on one of the rotatable input and output shafts. A magnetic rotor member is located concentric to, and inwardly from, the drum. The rotor member, containing a plurality of peripheral poles, has a collar for mounting the member on the other of the input and output shafts. A field coil generates a magnetic flux that causes torque transmission between the inductor and rotor members and the input and output shafts.

A stationary support for the field coil positions the field coil between the poles and collar of the rotor member. An arm of the support extends along the collar and under the coil so that the coil is supported at the end of the arm. The thickness of the coil support increases in a step-wise manner in a direction away from the end of the arm. The diameter of the collar of the rotor member is reduced in a corresponding manner.

The step-wise increasing thickness of the coil support arm provides an increasing cross-sectional area to the arm as the flux through it increases, thereby optimizing flux passage through the coil support. The increasing thickness of the coil support arm also provides a greater cross-sectional area for removing heat generated in the field coil.

BEST MODE FOR CARRYING OUT INVENTION

Figure 1:
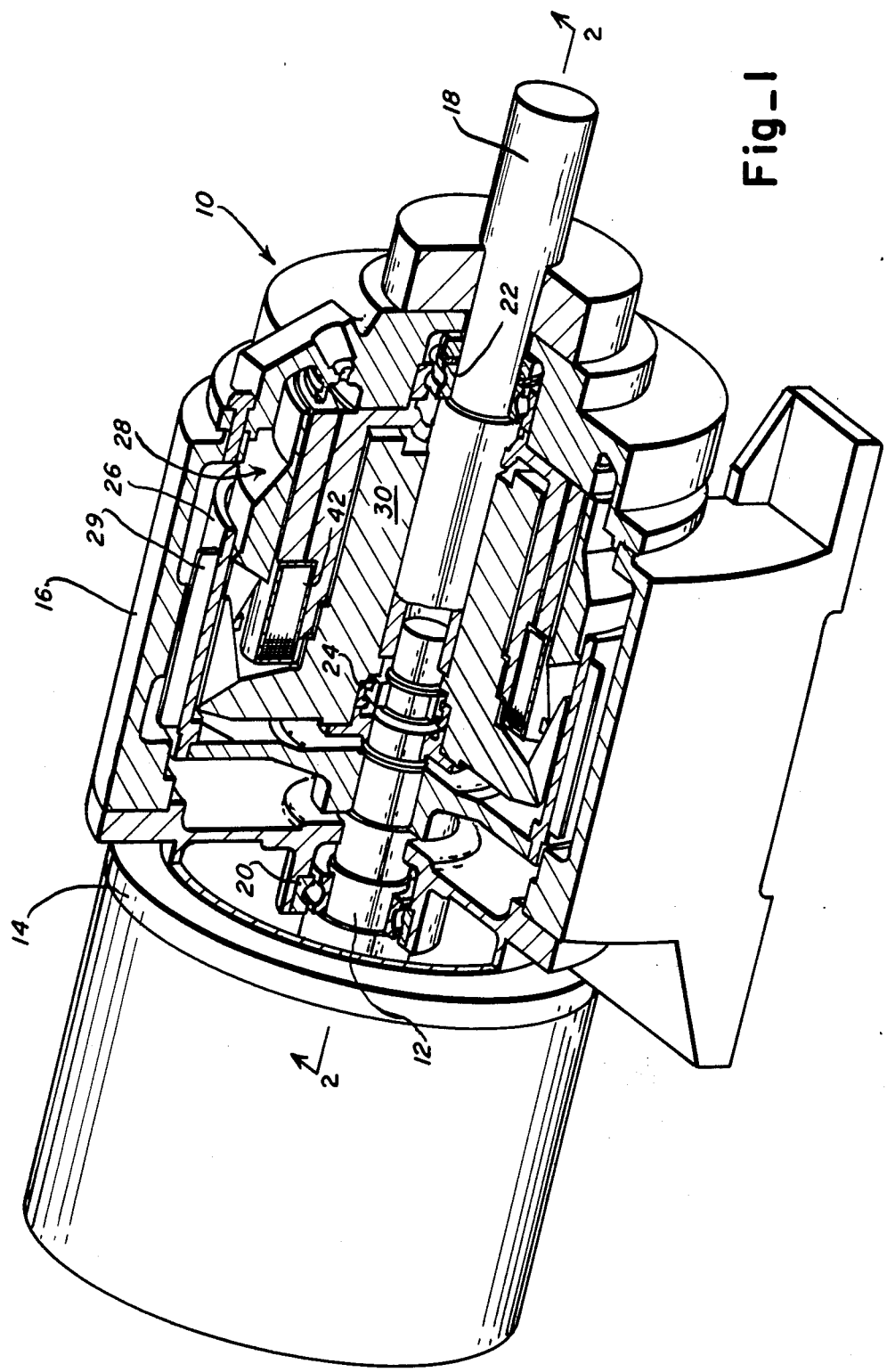
FIG. 1 is a partially cut away perspective view of an improved eddy current coupling of the present invention.

FIG. 1 shows an eddy current coupling device 10. Eddy current coupling 10 includes input shaft 12. Input shaft 12 is connected to a prime mover such as an a.c., constant speed induction motor 14 bolted to the housing 16 of the coupling device. Output shaft 18, coaxial with input shaft 12, is connected to the load, not shown, that is to be driven at variable speed.

Figure 2:
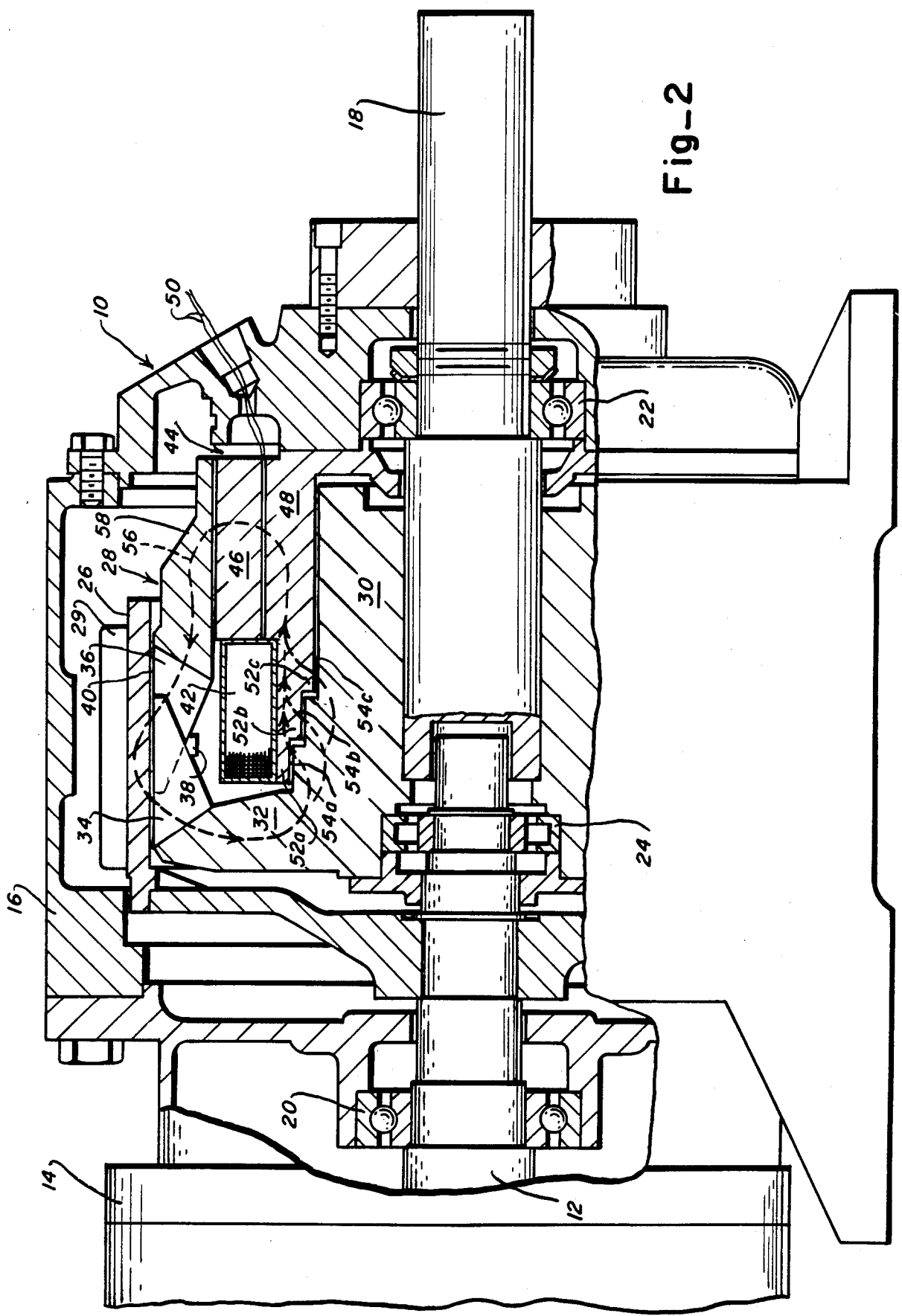
FIG. 2 is a detailed cross-sectional view taken along the line 2—2 of FIG. 1.

Shaft 12 is supported by two bearings in the motor, one of which is not shown, and the other of which is identified by the reference numeral 20 in FIG. 2. The output shaft 18 is supported by a bearing 22 and by a pilot bearing 24.

The magnetic coupling between input shaft 12 and output shaft 18 takes place between an inductor drum 26 and a rotor 28, the first of which is mounted on input shaft 12 and the latter of which is mounted on output shaft 18. Because of the considerable heat generated in inductor 26, it is common to utilize the inductor as the exterior member and to mount it on constant speed input shaft 12. As illustrated in FIGS. 1 and 2, inductor drum 26 is a cup-like member of high magnetic permeability and electrical conductivity, the exterior of which is often increased in surface area by the use of fins such as the plurality of cooling fins 29.

Rotor 28, on output shaft 18, includes a collar 30 keyed to output shaft 18. A hub portion 32 extends from the collar 30 to a first set of poles 34 mounted on the periphery of rotor 28. The first set 34 and a second set of poles 36, interdigitated with the first set, are mechanically joined to opposite sides of a nonmagnetic structure, such as a band 38. Pole sets 34 and 36 are spaced from inductor 26 by circumferential air gap 40.

A field coil 42 is concentrically mounted radially within the rotor 28 on a field coil support 44. The field coil support 44 may be generally L-shaped, having an arm 46 that is fastened to the housing 16 and an arm 48 that extends beneath the coil 42. Coil leads 50 extend through arm 46 and housing 16 for energizing the coil.

In accordance with the present invention, the cross-sectional area of the outer end of arm 48 increases in a stepwise fashion in a direction away from the end of the arm. Three such steps 52a, 52b, and 52c are shown in FIG. 2. The diameter of collar 30 is correspondingly reduced in a step-wise fashion to form air gaps 54a, 54b, and 54c.

In operation, field coil 42 is energized with direct current through leads 50 to provide an encircling flux 56 shown by the dotted lines in FIG. 2. The flux 56 passes from one pole set 36 through inductor drum 26, driven by motor 14, to the adjacent rotor pole set 34. The rotation of the drum 26 through flux 56 generates eddy currents in the drum 26. The eddy currents react with the flux to transmit torque from the drum to the rotor 28 and, accordingly, to output shaft 18. The amount of torque that can be transmitted at a given slip speed (and, therefore, at a given output speed) is determined by the field strength of the field coil 42.

The return path of flux 54 includes hub 32 and collar 30. From there, the flux passes in parallel paths across air gaps 54a, 54b, and 54c to arm 48 of coil support 44 and from there through arm 46 to pole support 58 and poles 36 and 34. Due to the stepped configuration of arm 48 an increased cross-sectional area is provided to arm 48 as the cumulative flux in the parallel paths increases. This enhances the flux carrying capability of arm 48 and avoids magnetic saturation.

Of equal importance is the fact that the increasing mass of arm 48 faciliates carrying off the heat generated by field coil 42 by conduction through the mass.

While three steps are shown in FIGS. 1 and 2, it will be appreciated that other numbers of steps can be utilized, depending on the specific configuration of eddy current coupling 10. The number of steps may approach an idealized slanting surface while avoiding the problems of such a surface. With a slanting surface, variations in the axial positioning of rotor 28 and coil support 44 would cause significant alteration in the air gap between the elements. This does not occur with air gaps 52a, 52b, and 52c in which the flux passes in a radial direction. The radial width and axial length of air gaps 52a, 52b, and 52c are selected to reduce flux losses in the gaps.

The invention is not to be taken as limited to all of the details thereof as modifications and variations thereof may be made without departing from the spirit or scope of the invention.

Accordingly, what is claimed is:

1. An eddy current coupling comprising:
   rotatable input and output shafts;
   a generally tubular inductor member mounted on one of said input and output shafts for rotation therewith;
   a magnetic rotor member having a collar mounted on the other of said input and output shafts for rotation therewith, said rotor member being located within said inductor member and having a plurality of peripheral, arcuately spaced poles separated from said inductor member by a circumferential air gap;
   a field coil generating an encircling magnetic flux causing torque transmission between said inductor and rotor members and said input and output shafts; and
   a flux carrying support for said field coil, said support positioning said field coil radially inwardly from said rotor member and between said poles and collar, said support having a first portion for affixing said support in said coupling, said support having a second portion extending along said collar for supporting said coil at the end of said second portion, said collar and second portion having a stepped configuration increasing the thickness of said coil support in a step-wise manner in a direction away from said coil and toward said first portion of said support whereby a plurality of flux carrying air gaps are interposed between said collar and second portion.

2. The coupling according to claim 1 whereby the stepped configuration of said collar and second portion provide a plurality of air gaps across which said flux passes in a radial direction.

* * * * *